United States Patent

Takeda

(10) Patent No.: US 7,613,555 B2
(45) Date of Patent: Nov. 3, 2009

(54) VEHICULAR ROLLOVER PREVENTION CONTROL DEVICE

(75) Inventor: Masayoshi Takeda, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 332 days.

(21) Appl. No.: 11/296,461

(22) Filed: Dec. 8, 2005

(65) Prior Publication Data

US 2006/0129298 A1   Jun. 15, 2006

(30) Foreign Application Priority Data

Dec. 14, 2004   (JP) .............................. 2004-360959

(51) Int. Cl.
  *B60G 17/016*   (2006.01)
  *G06F 7/70*   (2006.01)
  *B60Q 1/00*   (2006.01)
(52) U.S. Cl. ............................. 701/38; 701/70; 340/429
(58) Field of Classification Search .................... 701/70
  See application file for complete search history.

(56) References Cited

U.S. PATENT DOCUMENTS 5,826,209 A * 10/1998 Matsuno ..................... 701/69
7,493,204 B2 * 2/2009 Yano ........................... 701/70
2002/0163437 A1   11/2002 Haas
2004/0193352 A1 * 9/2004 Ito et al. ....................... 701/70
2004/0254710 A1 * 12/2004 Yano ........................... 701/70

FOREIGN PATENT DOCUMENTS

JP       A-6-267985       10/1994
JP       A-11-83534        3/1999
WO    WO 2004/078532 A1    9/2004

OTHER PUBLICATIONS

Office Action dated Jan. 15, 2008 in corresponding German Patent Application No. 10 2005 059 205.8-21 (and English translation).

* cited by examiner

*Primary Examiner*—Mark Hellner
*Assistant Examiner*—Helal A Algahaim
(74) *Attorney, Agent, or Firm*—Posz Law Group, PLC (57) ABSTRACT

A start threshold value for rollover prevention control is changed based upon a ratio between an actual lateral G and a reference lateral G. Accordingly, the ratio between the actual lateral G and the reference lateral G is a parameter that indicates a vehicle condition, i.e., the potential for vehicle rollover that includes both the vehicle weight and the center of gravity height. It is therefore possible to set a start threshold value that considers the vehicle weight, center of gravity height and the like.

13 Claims, 6 Drawing Sheets

FIG. 6C NO LOAD

FIG. 6B STANDARD LOAD

FIG. 6A HIGH LOAD

FIG. 7

VEHICULAR ROLLOVER PREVENTION CONTROL DEVICE

CROSS REFERENCE TO RELATED APPLICATION

This application is based upon and claims the benefit of Japanese Patent Application No. 2004-360959 filed on Dec. 14, 2004, the content of which are incorporated herein by reference.

FIELD OF THE INVENTION

The present invention relates to a vehicular rollover prevention control device that detects the potential of a vehicle rollover by comparing a predetermined vehicle condition amount with a predetermined control start threshold value, and then executing a rollover prevention control if there is a possibility the vehicle may rollover.

BACKGROUND OF THE INVENTION

According to Japanese Patent Application Publication No. JP-A-6-297985, a rollover prevention control is disclosed. A vehicle's center of gravity position is preset based upon the vehicle's weight or the like. If the center of gravity position varies according to movement of the vehicle, a rollover prevention control is executed in response to such changes. More specifically, a roll angle sensor and a displacement-from-ground sensor are used to calculate the roll angle and a change amount in the center of gravity height resulting from vehicle movement. Based upon the calculated roll angle and the change amount in the center of gravity height, a start threshold value for the rollover prevention control is changed.

However, as in the case of sport utility vehicles (SUVs) and trucks, that is, vehicles loaded with a wide variety of cargo, a center of gravity position and weight with cargo will change considerably depending on the cargo arrangement and method. For example, the center of gravity height is high for a truck loaded up to carrying capacity. Even though the vehicle weight is the same, the center of gravity position in an SUV with more people sitting on right side seats is different from that in the SUV with an equal number of people sitting on the right and left sides.

For this reason, a method such as described in Japanese Patent Application Publication No. JP-A-6-297985 is inadequate. Namely, the method in Japanese Patent Application Publication No. JP-A-6-297985 sets the center of gravity position for each vehicle based upon the vehicle weight or the like. Since this is used for compensating a control start threshold value considering a vary amount of the center of gravity due to vehicle movement, the compensation range is small. Therefore, extensive changes in the vehicle weight or the like will result in a failure to adapt to cases in which center of gravity positions are completely different despite being for the same vehicle.

On the other hand, a method in Japanese Patent Application Publication No. JP-A-11-83534, proposes calculating a center of gravity height corresponding to changes in the vehicle cargo amount from a roll angle, the vehicle weight, and a lateral acceleration (hereinafter referred to as a "lateral G"). Thereafter, a start threshold value for an accompanying rollover prevention control is thus changed.

However, the three parameters consisting of the roll angle, the vehicle weight, and the lateral G are difficult to measure precisely. Therefore, precisely calculating the center of gravity height is difficult when calculated using the three parameters.

With regard to the roll angle, for example, the vehicle tilts when the effects of a right and left cant of a road surface affects, when more people sit on either the right or left side seats or when packages are loaded such that either the right or left side of the vehicle is heavier than the other. For this reason, it is difficult to determine where to set the zero position, i.e., the zero point, of the roll angle, which makes it impossible to obtain a precise roll angle. Furthermore, in Japanese Patent Application Publication No. JP-A-11-83534, the roll angle is calculated from an integral value of a roll rate. However, use of such an integral method accumulates integral errors, which lower the precision of the obtained roll angle.

With regard to the vehicle weight, an equation F=MG (F: brake force acting on vehicle, M: vehicle mass, G: vehicle deceleration) is used to calculate a vehicle weight M from a brake force F, which is calculated from a vehicle braking pressure P, and a vehicle deceleration G detected by an acceleration sensor.

However, the relationship between the vehicle braking pressure P and the vehicle deceleration G changes due to the longitudinal gradient of the road surface (uphill and downhill), air resistance, property changes caused by heat generated in brake materials, hysteresis, and the zero point setting for a longitudinal G sensor. The effect of such change is particularly large in a soft braking region often used during normal brake use. In addition, at times when an ABS control or the like intervenes during sudden braking, the relationship between the vehicle braking pressure P and the vehicle deceleration G is such that F≠MG. Therefore, making a precise calculation of the vehicle weight is difficult.

Figure 5:
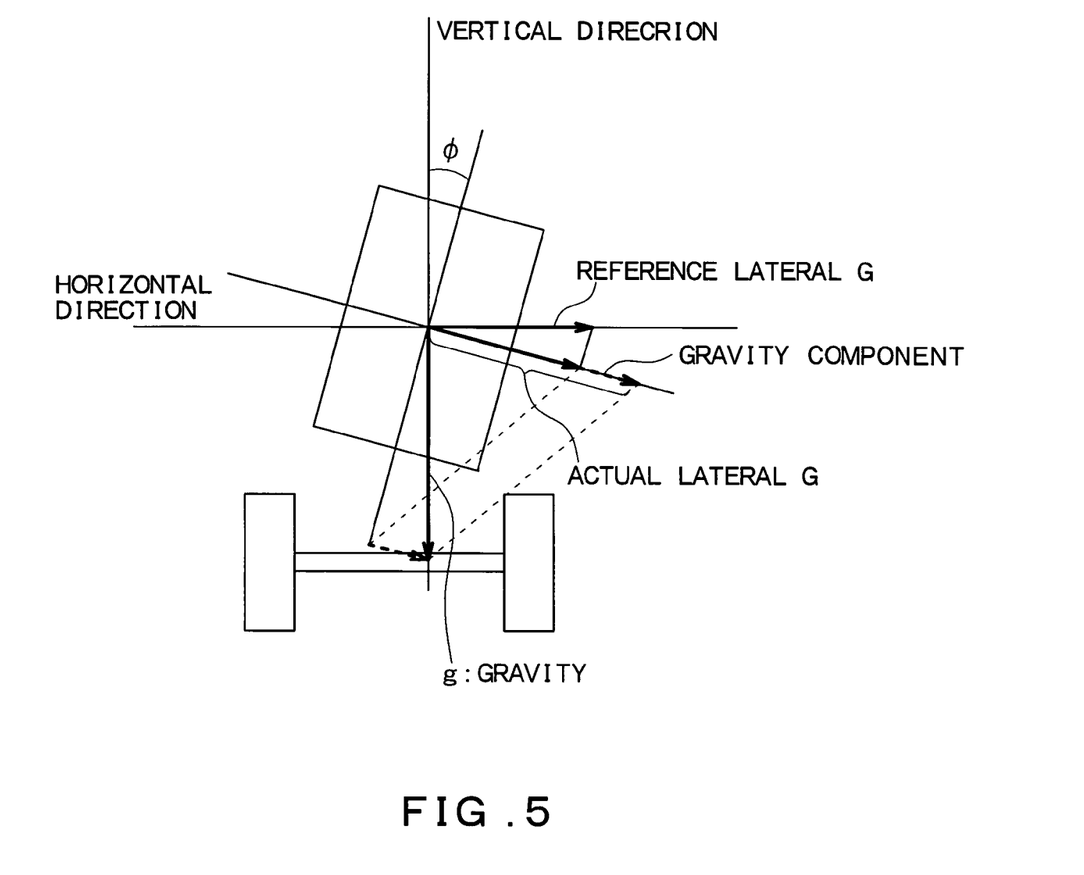

With regard to the lateral G, if the vehicle is tilted as shown in FIG. 5, a gravity component becomes included in an output signal of the lateral G sensor. In reality, the lateral G (hereinafter referred to as an "actual lateral G") obtained from the detection signal of the lateral G sensor is not the ideal lateral G, which should indicate only a horizontal-direction component.

SUMMARY OF THE INVENTION

In view of the foregoing points, it is an object of the present invention to provide a vehicular rollover prevention control device capable of executing a suitable rollover prevention control that considers vehicle conditions such as a vehicle center of gravity position.

The inventors devised a method for executing a suitable rollover prevention control that considers vehicle conditions such as the position of the vehicle center of gravity. In this method, the potential for rollover under a certain vehicle condition is calculated by a simple equation, and a start threshold value is set depending on the potential for rollover. A description of the method is given below.

First, the inventors studied a roll angle that is a parameter for estimating the vehicle condition. The roll angle $\phi$ is expressed by the following equation.

$$(\text{Roll angle } \phi) = \frac{(\text{Vehicle weight}) \times (\text{Center of gravity height}) \times (\text{Speed}) \times (\text{Turning angular speed})}{(\text{Roll rigidity}) - (\text{Vehicle weight}) \times (\text{gravity}) \times (\text{Center of gravity height})} \quad \text{Equation (1)}$$

The vehicle weight, vehicle center of gravity height, and roll rigidity are uniquely determined depending on the vehicle condition, while the speed and turning angular speed vary successively during vehicle travel. A lateral G obtained by ideally calculating speed×turning angular speed is an ideal lateral G not influenced by a gravity component (and is hereinafter referred to as a "reference lateral G"). Therefore, it is expressed as roll angle $\phi$=a1×Reference lateral G. Note that a1 is a constant expressed as a1=Vehicle weight×Center of gravity height/(Roll rigidity−Vehicle weight×gravity×Center of gravity height).

Accordingly, the roll angle $\phi$ increases due to increases in the vehicle weight or center of gravity height under the condition that the reference lateral G has reached a certain value, that is, based upon the same reference lateral G.

On the other hand, as the roll angle $\phi$ increases, the actual lateral G also increases a corresponding amount because the gravity component affects the output as described above.

Therefore, any increase in the roll angle $\phi$ due to increases in the vehicle weight or the center of gravity height, which are based upon the same reference lateral G, will result in an increased actual lateral G. In other words, the actual lateral G increases due to increases in the vehicle weight or the center of gravity height, despite the reference lateral G being the same value.

Regarding the above, actual tests were performed to measure the actual lateral G and the reference lateral G in cases of loading that creates a high center of gravity position (high load), loading that creates a common center of gravity height (standard load), and a vehicle with no load. The measurements were used to calculate actual lateral G/reference lateral G. The results are shown in FIGS. 6A to 6C and FIG. 7.

Figure 6A:
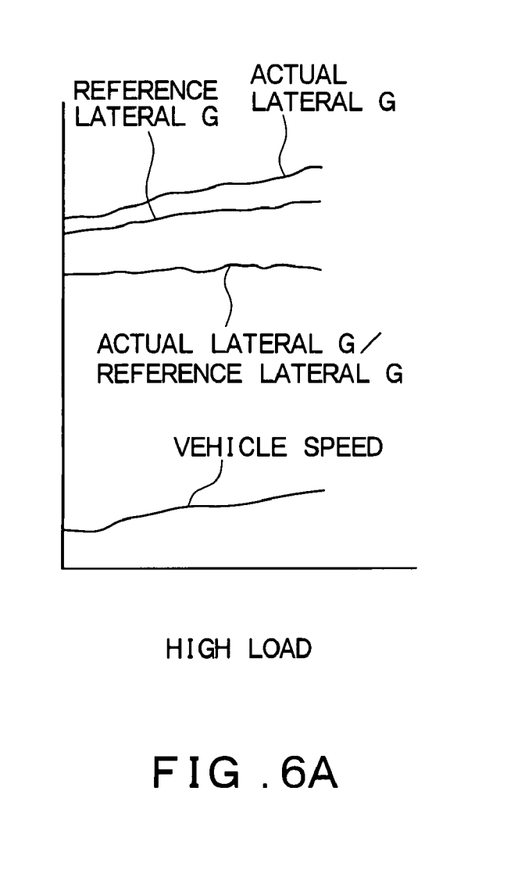
FIGS. 6A to 6C are graphs showing variations among the actual lateral G, the reference lateral G; and actual lateral G/reference lateral G on a time axis when gradually accelerated turning is performed with which steering angle is in 90 degree.
Figure 6B:
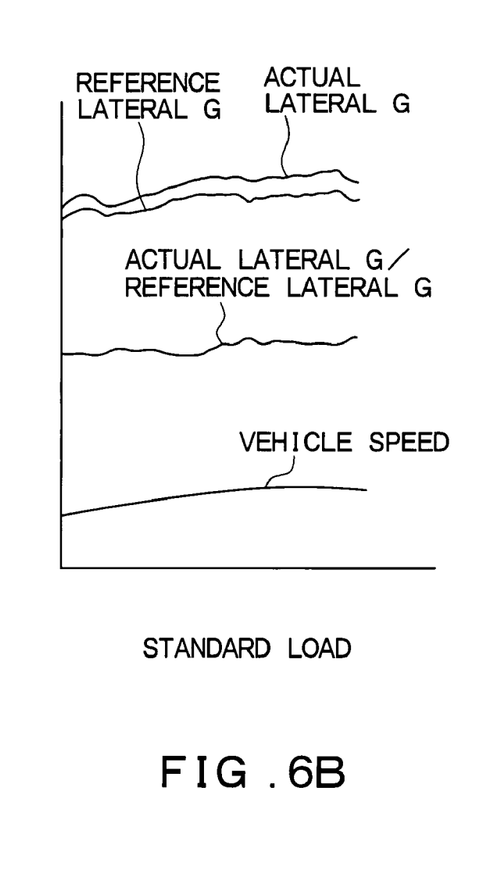
Figure 6C:
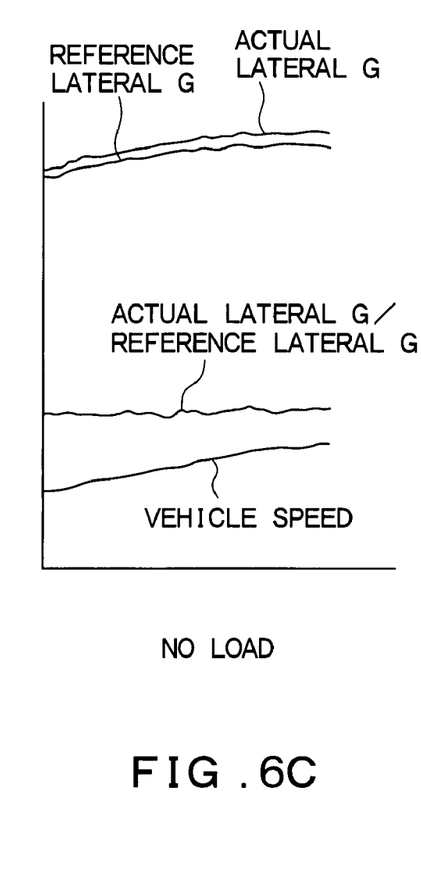

FIGS. 6A to 6C illustrate variations among the actual lateral G, the reference lateral G, and actual lateral G/reference lateral G on a time axis when gradually accelerated turning is performed with which a steering angle is in 90 degree. As the graphs show, the value for the ratio, actual lateral G/reference lateral G, does not change much even when there are variations in the actual lateral G and the reference lateral G. In other words, the actual lateral G/reference lateral G ratio remains an almost fixed value in each of the cases of a high load, a standard load, and no load. It is thus clear that the value of the ratio is determined depending on vehicle conditions such as the vehicle weight and the center of gravity height.

Figure 7:
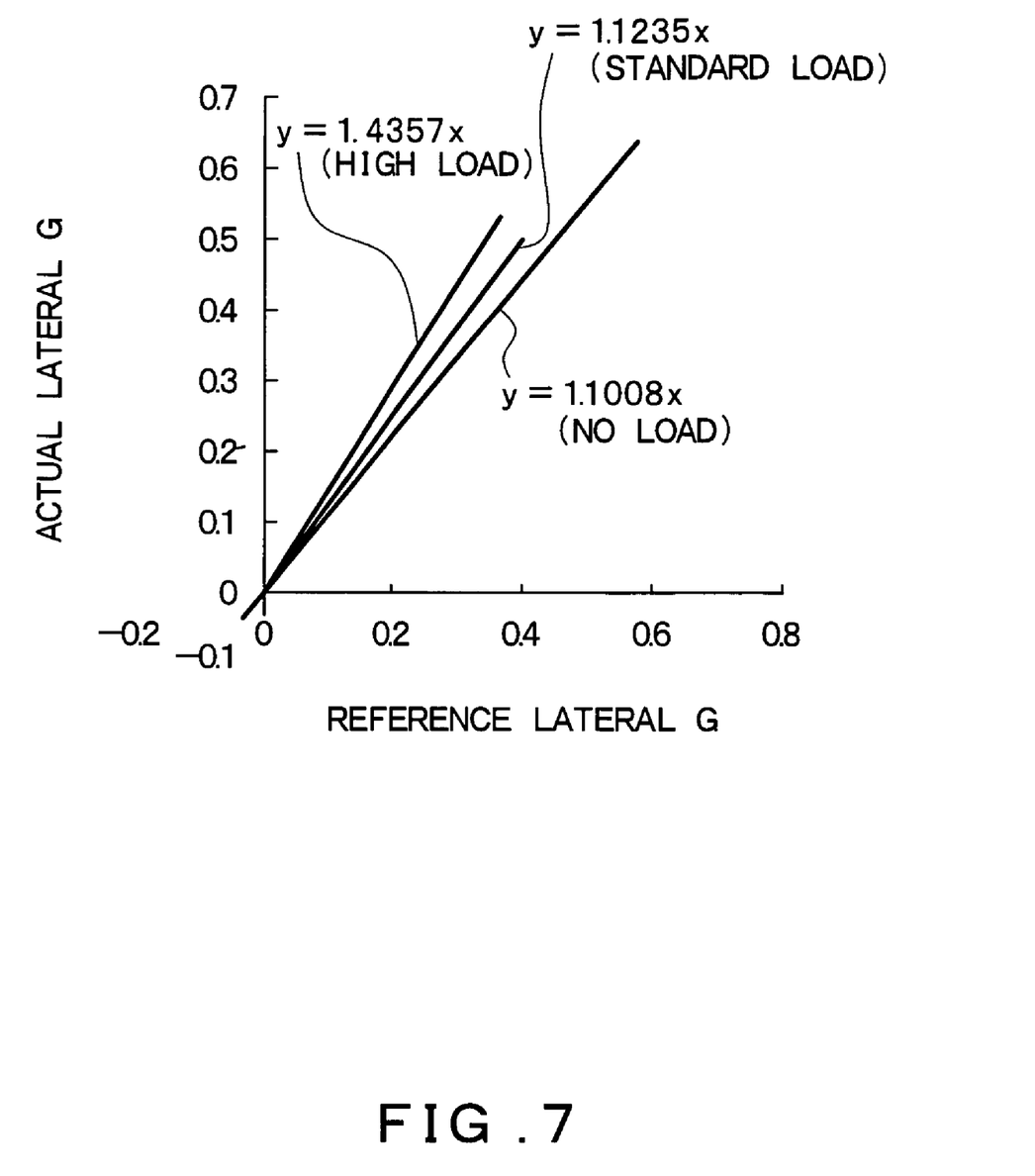
FIG. 7 is a graph showing a relationship between the actual lateral G and the reference lateral G in cases of a high load, a standard load, and with no load.

Furthermore, FIG. 7 is a graph based upon the results in FIGS. 6A to 6C, which shows a relationship between the actual lateral G and the reference lateral G in the cases of a high load, a standard load, and with no load. This graph also clearly shows that the relationship between the actual lateral G and the reference lateral G in each of the cases of a high load, a standard load, and no load can be expressed as a linear function, and that the value of the ratio is uniquely determined depending on the vehicle condition.

Accordingly, the ratio between the actual lateral G and the reference lateral G is used for a parameter indicating a tendency of the vehicle to rollover. The parameter directly includes both the vehicle weight component and the center of gravity height component. Based upon the calculated ratio between the actual lateral G and the reference lateral G, the tendency of the vehicle to rollover is determined so as to change the start threshold value for rollover prevention control depending on the potential for rollover. Thus, the start threshold value for rollover prevention control can be changed more precisely, easily, and quickly, without estimating the vehicle weight and the center of gravity height as in the past.

Note that the example described here used actual lateral G/reference lateral G as a parameter indicating the potential for vehicle rollover, that is, as a ratio between the actual lateral G and the reference lateral G. However, reference lateral G/actual lateral G may also be used. Furthermore, ratios between the actual lateral G and the reference lateral G can also be practically expressed by dividing the difference in the actual lateral G and the reference lateral G by either the actual lateral G or the reference lateral G ((actual lateral G−reference lateral G)/actual lateral G, or (actual lateral G−reference lateral G)/reference lateral G). Therefore, such ratios can also be used as parameters indicating the potential for vehicle rollover.

In order to achieve the above object, according to first to twelfth aspects of the present invention, a practical ratio is calculated from an actual lateral G detected by an actual lateral G detecting unit and a reference lateral G detected by a reference lateral G detecting unit. Based upon the ratio, a start threshold value is changed.

Thus, a ratio between the actual lateral G and the reference lateral G becomes a parameter that indicates a vehicle condition, i.e., the potential for vehicle rollover that includes both the vehicle weight component and the center of gravity height component, if the start threshold value for rollover prevention control is changed based upon the ratio between the actual lateral G and the reference lateral G. It is therefore possible to set a start threshold value that considers the vehicle weight, center of gravity height and the like.

Such a reference lateral G, for example, may be calculated based upon, for example, a vehicle speed and a turning angular speed according to the second aspect of the present invention; the vehicle speed and a steering angle according to the third aspect of the present invention; or a wheel speed for each wheel according to the fourth aspect of the present invention.

In addition, according to the fifth aspect of the present invention, the reference lateral G may be obtained based upon a detection signal from a lateral acceleration sensor provided under a suspension in the vehicle.

According to the sixth aspect of the present invention, the start threshold value is changed to a value (e.g. a low value) at which control can be started more easily during execution of an ABS control and a stability control (hereinafter referred to as "ESC" (Electronic Stability Control)) as compared to when such controls are not being executed.

During the execution of controls for ABS and ESC, there is a high possibility that the vehicle is unstable. The possibility of a rollover is thus higher than normal. For this reason, uniform settings are used that allow the rollover prevention control to be started as easy as possible in such cases. This in turn leads to quick starting of the rollover prevention control even when the vehicle has a tendency to become unstable.

According to the seventh aspect of the present invention, the start threshold value changing unit changes the start threshold value to a value at which control can be started more easily once execution of the ABS control and the stability control is completed up until a predetermined vehicle condition is reached, as compared to after the predetermined vehicle condition is reached.

There is a high possibility that the vehicle is unstable once execution of the ABS control and the stability control is completed until a predetermined vehicle condition is reached. The possibility of a rollover is thus higher than normal. For this reason, changing the start threshold value to a value at which control can be easily started makes it possible to obtain an effect identical to that in the sixth aspect.

According to the ninth aspect of the present invention, a practical ratio between the actual lateral acceleration and the reference lateral acceleration is calculated a plurality of times and stored in a storage mechanism. A mean value of the practical ratios between the actual lateral acceleration and the reference lateral acceleration stored in the storage mechanism is then learned as a practical ratio between the actual lateral acceleration and the reference lateral acceleration.

Performing such learning achieves more precise changing of the start threshold value for rollover prevention control.

In such a case, according to the tenth aspect of the present invention, meeting at least one of the following can be set as a condition for allowing learning: (a) no intervention of a brake hydraulic pressure control; (b) lateral G of a fixed value or greater generated during turning; (c) lateral G of a fixed value or greater generated when turning has continued for a predetermined time; and (d) no accompanying large acceleration in a longitudinal direction.

Providing such a condition for allowing learning can further increase the accuracy of learned content.

According to the eleventh aspect of the present invention, one of the following can be set as a condition for clearing a learned value: an engine is turned OFF; and the vehicle is stopped for a certain amount of time or longer. In this manner, cases where there is a possibility the vehicle weight or the center of gravity height may change can be set as conditions for clearing a learned value.

BRIEF DESCRIPTION OF THE DRAWINGS

Other objects, features and advantages of the present invention will be understood more fully from the following detailed description made with reference to the accompanying drawings. In the drawings:

FIG. 5 is a schematic diagram showing a relationship among the actual lateral G, the reference lateral G, gravity and the like;

DETAILED DESCRIPTION OF THE PREFERRED EMBODIMENTS

The present invention will be described further with reference to various embodiments in the drawings.

First Embodiment

Figure 1:
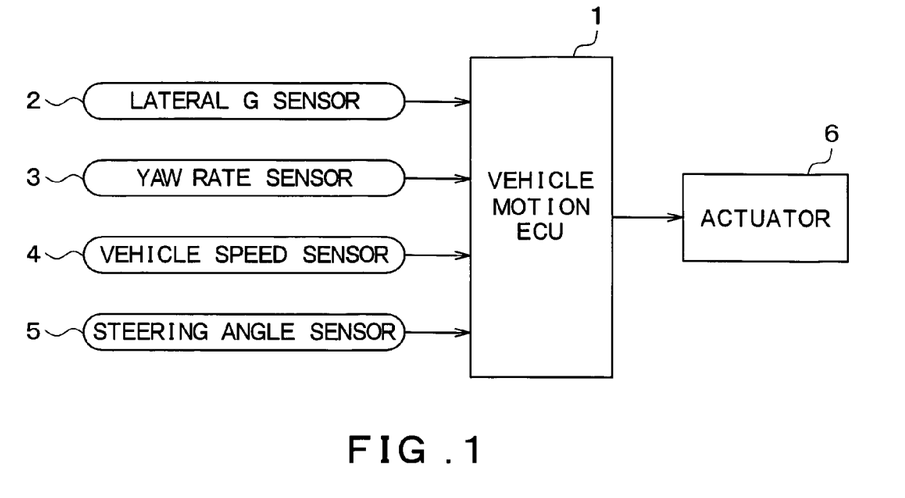
FIG. 1 is a block diagram of a vehicular rollover prevention control device according to a first embodiment of the present invention.

FIG. 1 shows a block diagram of a vehicular rollover prevention control device to which a first embodiment of the present invention is applied. The structure of the vehicular rollover prevention control device will be described hereinafter with reference to the figure.

As FIG. 1 shows, the vehicular rollover prevention control device is provided with a vehicle movement ECU 1. The vehicle movement ECU 1 is formed by a commonly known microcomputer having a CPU, a ROM, a RAM, an I/O and the like. A vehicle rollover prevention control is executed by the vehicle movement ECU 1 in accordance with programs stored in the ROM or the like.

Detection signals from a lateral G sensor 2, a yaw rate sensor 3, a vehicle speed sensor 4, and a steering angle sensor 5 are input to the vehicle movement ECU 1. Based upon the detection signals from the sensors 2 to 5, the vehicle movement ECU 1 executes various calculations. The vehicle movement ECU 1 then sends a drive signal to an actuator 6 for rollover prevention control to drive it based upon the results of the various calculations, thereby executing the vehicle rollover prevention control.

Such an actuator 6 for rollover prevention control is formed from, for example, an electromagnetic valve for brake hydraulic pressure control, and a motor for driving a pump. To generate a predetermined braking force for a wheel subject to the rollover prevention control, the motor is driven such that brake fluid is sucked up and discharged by the pump and the electromagnetic valves corresponding to the target wheel are also driven. Using this structure, pressure is thus applied to a wheel cylinder of the target wheel.

Note that the method for driving the actuator 6 used in the rollover prevention control is similar to commonly known methods. Therefore, details of the method are omitted here.

Figure 2:
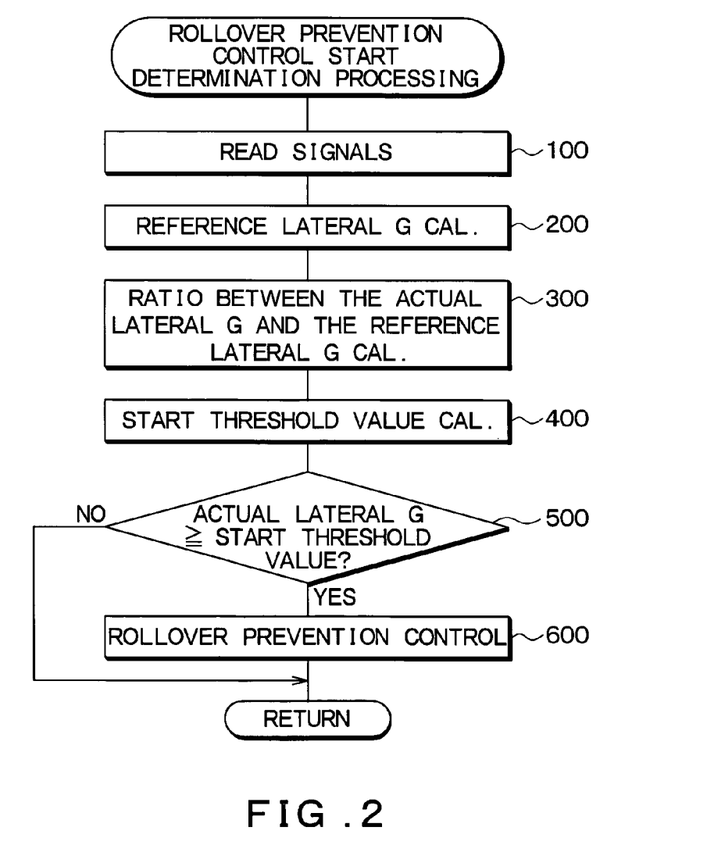
FIG. 2 is a flowchart of determination processing to start a rollover prevention control, which is executed by a vehicle movement ECU provided in the vehicular rollover prevention control device shown in FIG. 1.
Figure 3:
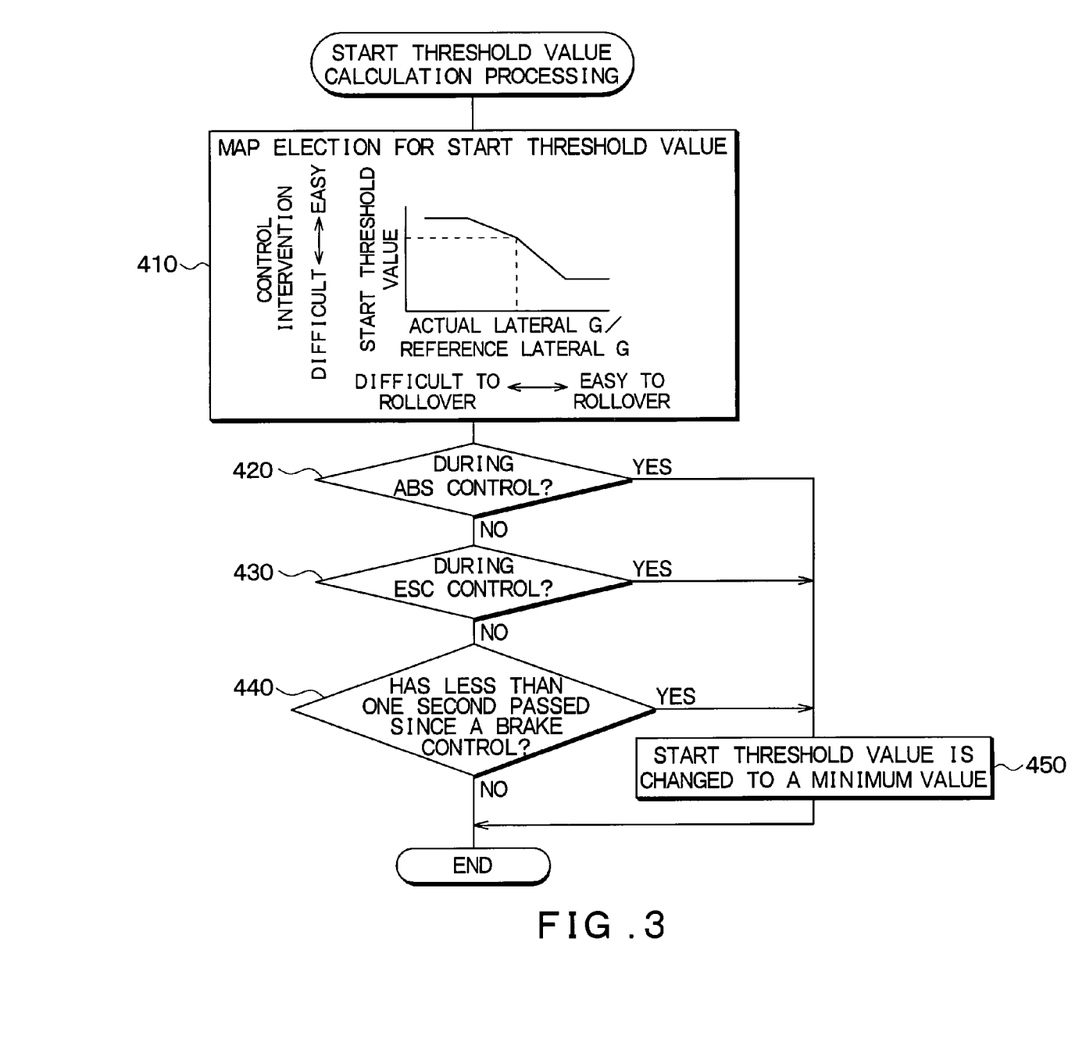
FIG. 3 is a flowchart of start threshold value calculation processing that is executed during the determination processing to start the rollover prevention control shown in FIG. 2.

Next, the rollover prevention control according to the vehicular rollover prevention control device formed as described above will be now described. FIG. 2 is a flowchart of determination processing to start the rollover prevention control that is executed by the vehicle movement ECU 1 shown in FIG. 1. In addition, FIG. 3 is a flowchart of calculation processing of a start threshold value for rollover prevention control in the rollover prevention control processing. Note that steps shown in the figures correspond to mechanisms executing the various processing.

Hereinafter, the determination processing to start the rollover prevention control will be described in detail with reference to the drawings.

First, once an ignition switch (not shown) in the vehicle is turned ON, power is supplied to the vehicle movement ECU 1, which executes the determination processing to start the rollover prevention control. The processing to determine starting of the rollover prevention control is, for example, executed in predetermined calculation cycles, and constantly executed while the ignition switch is ON.

At 100, processing to read signals is executed. Namely, detection signals are read from the above-mentioned lateral G sensor 2, the yaw rate sensor 3, the vehicle speed sensor 4, and the steering angle sensor 5. Using the detection signals, physical quantities known as an actual lateral G, a turning angular speed (yaw rate), a vehicle speed, and a steering angle are calculated. Portions executing such processing in the vehicle movement ECU 1 correspond to an actual lateral acceleration detecting unit, a vehicle speed detecting unit, a turning angular speed detecting unit, and a steering angle detecting unit respectively. Furthermore in embodiments to be described later, a wheel speed is also detected by the vehicle movement ECU 1. In such cases, a portion executing such processing corresponds to a wheel speed detecting unit.

Following at 200, the reference lateral G is calculated. The reference lateral G mentioned here indicates an ideal lateral G that does not include the influence of the gravity component described above. It is calculated from the product of the vehicle speed and the turning angular speed (reference lateral G=vehicle speed×turning angular speed). A portion executing such processing in the vehicle movement ECU 1 corresponds to a reference lateral acceleration detecting unit.

Next at 300, a ratio between the actual lateral G and the reference lateral G, i.e., actual lateral G/reference lateral G, is calculated. A portion executing such processing in the vehicle movement ECU 1 corresponds to a ratio calculating unit. The ratio between the actual lateral G and the reference lateral G may represent a practical ratio between the actual lateral G and the reference lateral G as described above, but is not particularly limited to actual lateral G/reference lateral G. For example, ratios such as reference lateral G/actual lateral G, or (actual lateral G−reference lateral G)/actual lateral G, or (actual lateral G−reference lateral G)/reference lateral G are also applicable.

At 400, processing to calculate the start threshold value of the rollover prevention control is executed. A portion executing such processing in the vehicle movement ECU 1 corresponds to a start threshold value changing unit.

Figure 4:
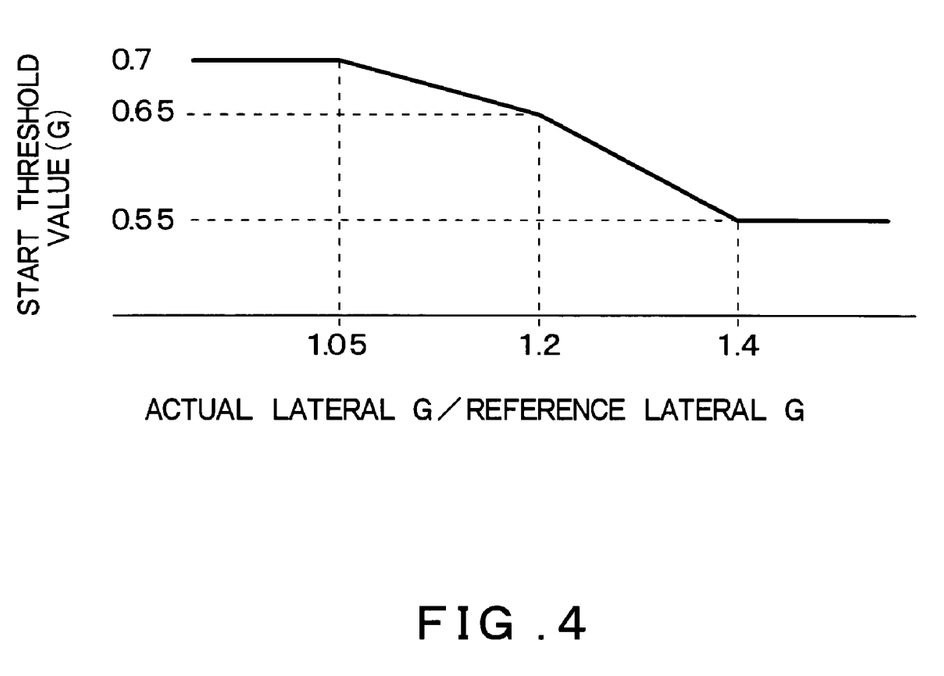
FIG. 4 is a map showing a relationship between a start threshold value and a ratio of an actual lateral G/reference lateral G.

More specifically as shown by 410 in FIG. 3, a start threshold value map is used to calculate a start threshold value corresponding to the value for actual lateral G/reference lateral G obtained at 300. For the start threshold value map, a map such as shown in FIG. 4 may be employed. In the start threshold value map shown in this figure, the start threshold value decreases as actual lateral G/reference lateral G increases, that is, as the influence of the gravity component on the actual lateral G increases. When the actual lateral G is higher than the reference lateral G, the roll angle becomes large because center of gravity height is high or the vehicle weight is heavy. In other words, it can be assumed that the vehicle condition is such that there is a potential for rollover. In such cases, the start threshold value is set so that it is easier to start the rollover prevention control.

Subsequently at 420, it is determined whether ABS control is being executed. It is then determined at 430 whether a control for ESC is being executed. At 440, it is further determined whether less than one second has passed since a brake control. If even one of any of these determinations made in 420 to 440 is affirmative, the processing proceeds to 450 where the start threshold value is changed to a minimum value (0.55 in the case of the map in FIG. 4).

In other words, during controls for ABS or ESC, or within one second of a brake control, there is a high possibility that the vehicle is unstable, which makes the possibility of a rollover higher than normal. In such cases, the start threshold value is uniformly changed so that the rollover prevention control can be started as easily as possible. Thus even if the start threshold value is set to a maximum value (0.7 in the case of the map in FIG. 4) at 410, it is subsequently changed to the minimum value. The rollover prevention control can therefore be quickly started if the vehicle tends to become unstable.

Note that the passage of a predetermined time (one second) was given here as an example of a predetermined state being reached after a control for ABS or ESC. However, other examples are conceivable such as the passage of a predetermined time once the lateral G, the yaw rate, or the steering angle becomes equal to or less than a predetermined value. If any one of these is equal to or less than the predetermined value, then the start threshold value of the rollover prevention control can be returned to its original value from the value at which the rollover prevention control can be easily started.

Following the calculation of the start threshold value, the processing proceeds to 500. Here it is determined whether the actual lateral G obtained at 100 is equal to or greater than the start threshold value set at 400. If the actual lateral G is equal to or greater than the start threshold value, the processing proceeds to 600, where a drive signal is output to start the rollover prevention control. At this time, for example, it is determined whether the vehicle is currently turning right or left based upon the turning angular speed and the steering angle obtained at 100. Depending on the turning direction, a drive signal is output so as to generate a braking force for the wheel that is an object wheel to be controlled.

On the other hand, if the actual lateral G is less than the start threshold value at 500, the processing to determine the start of rollover prevention control is thus ended as starting of rollover prevention control is deemed not necessary. Thereafter, the processing to determine the start of rollover prevention control is repeatedly executed for each calculation cycle in the above order.

As described above, according to the vehicular rollover prevention control device of the present embodiment, a start threshold value for rollover prevention control is changed based upon a ratio between an actual lateral G and a reference lateral G. The ratio between the actual lateral G and the reference lateral G is a parameter that indicates a vehicle condition, i.e., the potential for vehicle rollover that includes both the vehicle weight and the center of gravity height. It is therefore possible to set a start threshold value that considers the vehicle weight, center of gravity height and the like.

Thus, the start threshold value for rollover prevention control can be set more precisely, easily and quickly, without estimating the vehicle weight and the center of gravity height as in the past.

In addition, use of such a ratio between the actual lateral G and the reference lateral G can also take into account the influence of right and left inclinations (cants) of the road surface. For example, if the road surface cant is a gradient that slopes downward in a direction where the vehicle is prone to rollover (turning outer side) the actual lateral G increases. This in turn increases the ratio between the actual lateral G and the reference lateral G, leading to a determination that the vehicle is in a state with the potential for rollover. Therefore, the start threshold value is set low. Consequently, the timing at which the rollover prevention control intervenes can be set earlier. Of course, the opposite is true in the case of a cant in the opposite direction. In either case, a rollover prevention control can be achieved in accordance with the cant.

A rollover prevention control that responds more precisely to the vehicle condition than those in the past can be achieved. For example, unnecessary operations can be avoided, such as starting the rollover prevention control despite there being no need for intervention from the rollover prevention control.

Other Embodiments (1) In the first embodiment, the reference lateral G is obtained by multiplying the vehicle speed and the turning angular speed. However, it is also possible to calculate using the steering angle obtained based upon the detection signal from the steering angle sensor 5. To be specific, the reference lateral G can be obtained based upon the following equation.

$$\text{(Reference lateral } G) = \frac{(\text{Speed})^2 \times (\text{Steering angle}) \times A}{(\text{Steering gear ratio}) \times (\text{Wheel base})} \times \frac{1}{1 + A \times (\text{Speed})^2} \quad \text{Equation (2)}$$

Note that A in the above equation is a stability factor indicating a turning property of the vehicle. Since it is commonly known, for example, in Japanese Patent Application Publication No. JP-A-10-258720 and the like, a detailed explanation of A is omitted here.

Thus, similar to the first embodiment, the actual lateral G/reference lateral G ratio is a value determined depending upon vehicle conditions such as the vehicle weight and the center of gravity height. This is the case even when the reference lateral G is calculated using the steering angle obtained based upon the detection signal from the steering angle sensor 5.

Accordingly, after calculating the actual lateral G/reference lateral G ratio from the reference lateral G using the steering angle, the start threshold value for rollover prevention control can be modified based upon the ratio. In this manner, an effect identical to that of the first embodiment can be obtained.

Furthermore, the reference lateral G can also be calculated from a wheel speed. In such a case, a signal from a wheel speed sensor (not shown) is input to the vehicle movement ECU 1, or information related to the wheel speed is input from another ECU (not shown) mounted in the vehicle via a LAN connection. The reference lateral G is then calculated using such signals or information. Since it is also possible to find the vehicle speed based up on the wheel speed, the vehicle speed sensor 4 shown in FIG. 1 can be omitted in this case. To be specific, the reference lateral G can be obtained based upon the following equation.

$$\text{(Reference lateral } G) = \frac{\text{(Right}-\text{left wheel speed difference)} \times \text{(Speed)}}{\text{(Tread)}} \quad \text{Equation (3)}$$

Thus, similar to the first embodiment, the actual lateral G/reference lateral G ratio is a value determined depending upon vehicle conditions such as the vehicle weight and the center of gravity height. This is the case even when the reference lateral G is calculated using the wheel speed.

Accordingly, after calculating the actual lateral G/reference lateral G ratio from the reference lateral G using the wheel speed, the start threshold value for rollover prevention control can be modified based upon the ratio. In this manner, an effect identical to that of the first embodiment can be obtained.

Furthermore, the reference lateral G can also be obtained based upon a detection signal from the lateral G sensor, instead of being calculated. For example, the lateral G sensor can be mounted under the suspension instead of above one, with the detection signal from the sensor input to the vehicle movement ECU 1. Due to such a configuration, the detection signal from the lateral G sensor does not include the gravity component caused by rolling of the vehicle which is included in the detection signal from that on the suspensions. Therefore, the lateral G obtained from the detection signal can be employed as the reference lateral G.

(2) Regarding the first embodiment, the ratio between the actual lateral G and the reference lateral G may be periodically measured so that a mean value of the measured values may be stored in a storage mechanism within the vehicle movement ECU 1. Through such learning, the start threshold value for rollover prevention control can be changed more precisely.

In this case, the following conditions (a) to (d), for example, are conceivable as conditions for allowing learning. Learning may be allowed if any one of the conditions shown below is satisfied, although the accuracy of the learned content will further increase if learning is allowed only when a plurality of conditions is satisfied.

(a) There is no intervention from controls for ABS and ESC.

(b) Lateral G of a fixed value or greater is generated during turning.

(c) Lateral G of a fixed value or greater is generated when turning has continued for a predetermined time.

(d) There is no accompanying large acceleration in the longitudinal direction.

Item (a) is set as a condition because the actual lateral G and the reference lateral G obtained during the execution of controls for ABS and ESC have low reliability. This is due to the fact that the wheels are not in a grip condition during such times. Item (b) is set as a condition because the actual lateral G and the reference lateral G are both small during gradual turning, thus creating a large calculation error when the ratio between these lateral G is calculated. Item (c) is set as a condition because less calculation error is generated during steady turning. Therefore, if circumstances that generate a lateral G of a fixed value or greater continue for a certain amount of time, steady turning can be assumed. Similar to item (c), item (d) is set as a condition in light of the fact that a large acceleration in the longitudinal direction accompanies non-steady turning, whereas a large acceleration in the longitudinal direction does not accompany steady turning.

Note that to determine whether the controls for ABS and ESC are being executed, a flag is set during the control in a brake ECU or the like. Therefore, the determination can be made by obtaining information related to the flag via a LAN connection or the like. With regard to acceleration in the longitudinal direction as well, it may be obtained using a detection signal from a general acceleration sensor installed in the vehicle, or by another ECU based upon the detection signal. In such cases, related information may be obtained by the vehicle motion ECU 1 via the LAN connection or the like.

The learning timing at which the above-described learning is executed can be set as follow, for example. After measuring the ratio between the actual lateral G and the reference lateral G at intervals of several tens of milliseconds to hundreds of milliseconds during the course of one turn, the data is temporarily stored in the storage mechanism. Once data is stored a certain number of times, or once the turn is completed, the mean value is obtained for the ratios between the actual lateral G and the reference lateral G stored in storage mechanism. This mean value can be compared against previously stored learning values or subject to weighted moving average processing or the like, and thus stored as a new learning value.

In such cases, conditions for clearing the learned content may be set to circumstances in which there is a possibility the vehicle weight or the center of gravity height may change. For example, the engine (ignition switch) being turned OFF, or the vehicle being stopped for a certain amount of time or longer.

While the above description is of the preferred embodiments of the present invention, it should be appreciated that the invention may be modified, altered, or varied without deviating from the scope and fair meaning of the following claims.

What is claimed is:

1. A vehicular rollover prevention control device configured such that a rollover prevention control is executed when a rollover status value indicating a tendency of the vehicle to rollover exceeds a predetermined start threshold value, the vehicular rollover prevention control device comprising:

an actual lateral acceleration detecting unit configured to detect an actual lateral acceleration generated by the vehicle;

a reference lateral acceleration detecting unit configured to detect a reference lateral acceleration which does not include a gravity component of the vehicle;

a ratio calculating unit configured to calculate a practical ratio between the actual lateral acceleration detected by the actual lateral acceleration detecting unit and the reference lateral acceleration detected by the reference lateral acceleration detecting unit; and a start threshold value changing unit configured to learn the practical ratio and to change the start threshold value based upon the practical ratio between the actual lateral acceleration and the reference lateral acceleration calculated by the ratio calculating unit.

2. The vehicular rollover prevention control device according to claim 1, further comprising:

a vehicle speed detecting unit for detecting a vehicle speed of the vehicle; and a turning angular speed detecting unit for detecting a turning angular speed of the vehicle, wherein the reference lateral acceleration detecting unit calculates the reference lateral acceleration based upon the vehicle speed detected by the vehicle detecting unit and the turning angular speed detected by the turning angular speed detecting unit.

3. The vehicular rollover prevention control device according to claim 1, further comprising:

a vehicle speed detecting unit for detecting a vehicle speed of the vehicle; and a steering angle detecting unit for detecting a steering angle of the vehicle, wherein the reference lateral acceleration detecting unit calculates the reference lateral acceleration based upon the vehicle speed detected by the vehicle detecting unit and the steering angle detected by the steering angle detecting unit.

4. The vehicular rollover prevention control device according to claim 1, further comprising:

a wheel speed detecting unit for detecting a wheel speed of each wheel of the vehicle, wherein the reference lateral acceleration detecting unit calculates the reference lateral acceleration based upon the wheel speed of each wheel detected by the wheel speed detecting unit.

5. The vehicular rollover prevention control device according to claim 1, wherein the reference lateral acceleration detecting unit detects the reference lateral acceleration based upon a detection signal from a lateral acceleration sensor provided under a suspension.

6. The vehicular rollover prevention control device according to claim 1, wherein the start threshold value changing unit changes the start threshold value to a value at which vehicle rollover prevention control can be staffed more easily during execution of an ABS control and a stability control as compared to when such controls are not being executed.

7. The vehicular rollover prevention control device according to claim 1, wherein the start threshold value changing unit changes the start threshold value to a value at which vehicle rollover prevention control can be started more easily once execution of the ABS control and the stability control is completed up until a predetermined vehicle condition is reached, as compared to after the predetermined vehicle condition is reached.

8. The vehicular rollover prevention control device according to claim 1, wherein the start threshold value changing unit changes the start threshold value based upon a map indicating a relationship of the start threshold value and the practical ratio between the actual lateral acceleration and the reference lateral acceleration.

9. The vehicular rollover prevention control device according to claim 1, wherein the ratio calculating unit calculates a plurality of times and stores in a storage mechanism the practical ratio between the actual lateral acceleration and the reference lateral acceleration, and a mean value of the practical ratios between the actual lateral acceleration and the reference lateral acceleration stored in the storage mechanism is learned as a practical ratio between the actual lateral acceleration and the reference lateral acceleration.

10. The vehicular rollover prevention control device according to claim 9, wherein the ratio calculating unit sets for allowing the learning to be satisfied with at least one of the following as a condition:

(a) no intervention of a brake hydraulic pressure control;

(b) lateral acceleration of a fixed value or greater generated during turning;

(c) lateral acceleration of a fixed value or greater generated when turning has continued for a predetermined time; and (d) no accompanying large acceleration in a longitudinal direction.

11. The vehicular rollover prevention control device according to claim 9, wherein the ratio calculating unit sets for clearing a learned value obtained through the learning to be satisfied with one of the following as a condition:

an engine is turned OFF; and the vehicle is stopped for a predetermined amount of time or longer.

12. The vehicular rollover prevention control device according to claim 1, wherein the actual lateral acceleration is used as the rollover status value indicating a tendency to rollover, and the rollover prevention control is started when the actual lateral acceleration exceeds the start threshold value.

13. The vehicular rollover prevention control device according to claim 1, wherein the reference lateral acceleration is calculated as a product of a vehicle speed and a turning angular speed.

* * * * *